United States Patent [19]
Remberg

[11] 3,920,251
[45] Nov. 18, 1975

[54] SHAFT SEAL WITH AXIAL LABYRINTH FOR STEAM TURBINES

[75] Inventor: Axel Remberg, Mulheim (Ruhr), Germany

[73] Assignee: Kraftwerk Union Aktiengesellschaft, Mulheim (Ruhr), Germany

[22] Filed: Apr. 23, 1974

[21] Appl. No.: 463,383

[30] Foreign Application Priority Data
Apr. 24, 1973  Germany............................ 2320691

[52] U.S. Cl................. 277/53; 277/192; 415/170 R
[51] Int. Cl.² .......................................... F16J 15/48
[58] Field of Search......277/1, 11, 9, 53, 54, 55, 165, 277/123, 124, 176, 136, 137, 187, 188, 189, 192, 195, 197, 199, 218; 415/170 R, 171, 172

[56] References Cited
UNITED STATES PATENTS
1,792,288   2/1931   Dempster............................ 277/53

FOREIGN PATENTS OR APPLICATIONS
277,806   9/1927   United Kingdom.................. 277/53

Primary Examiner—Robert I. Smith
Attorney, Agent, or Firm—Herbert L. Lerner

[57] ABSTRACT

Shaft seal means for steam turbines having a unitary housing with a shaft bore. An undercut circular slot is provided in the surface of the shaft bore for receiving sealing ring segments. The housing has a recess in the end face of the housing which is open toward the shaft bore, and has at least the width and height of a ring segment and an axial depth sufficient to intersect said circular slot. A plurality of ring segments are inserted into said circular slot through the recess and a shaped fitting piece is mounted to close off the recess. A plurality of slots and sealing ring segments may be used to provide a sealing labyrinth.

3 Claims, 6 Drawing Figures

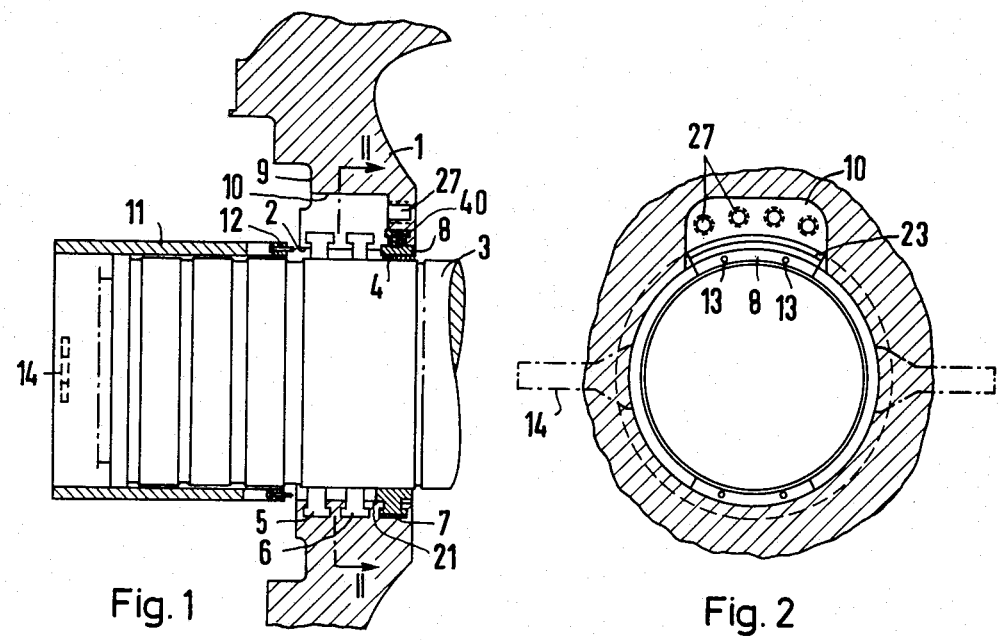
Fig. 1
Fig. 2
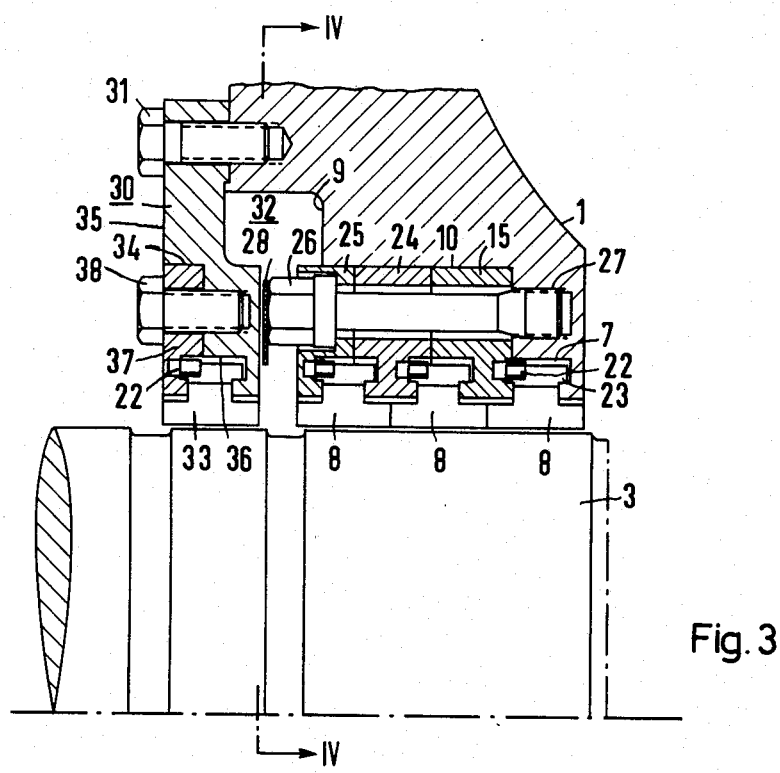
Fig. 3

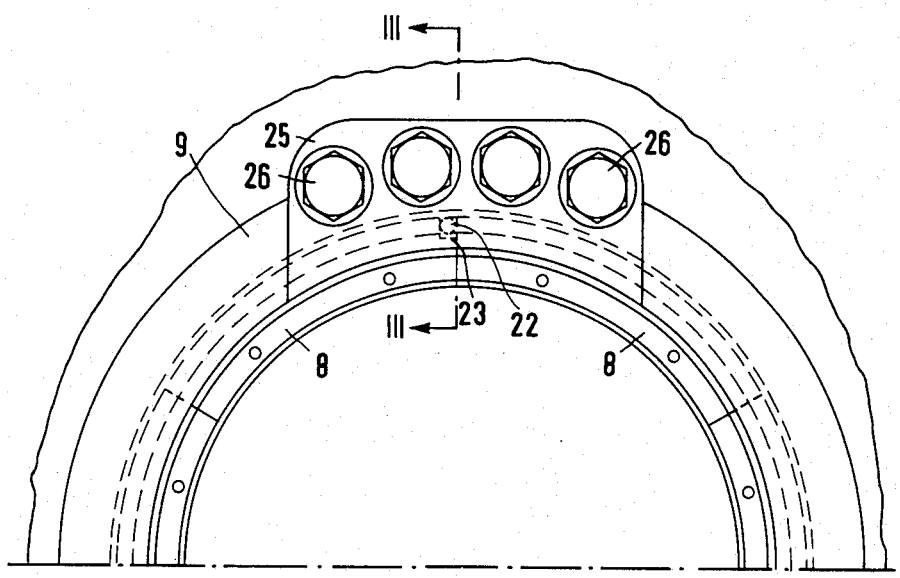
Fig. 4
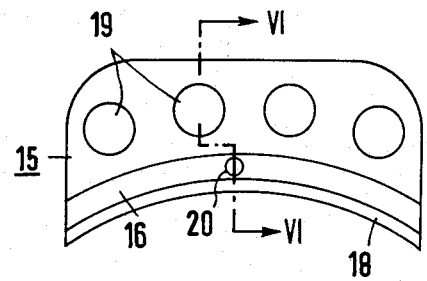 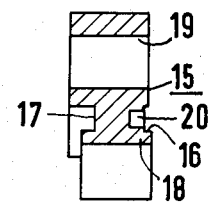
Fig. 5 Fig. 6

SHAFT SEAL WITH AXIAL LABYRINTH FOR STEAM TURBINES

This invention relates to shaft seal means having an axial labyrinth seal for steam turbines having a one piece housing.

Shaft seals for axially split housings are known, for instance from the German published non-prosecuted Patent Application, DOS 1,812,492. In such systems, the axial seal labyrinth is inserted as shown in the German Pat. No. 1,207,740 into a separate axially split housing which encloses the shaft. This separate housing requires special supports and also sliding seals for sealing the individual pressure spaces of the pressure stages. This requires considerable manufacturing and installation effort.

The present invention provides shaft seal means for steam turbines having a unitary housing with a shaft bore. An undercut circular slot is provided in the surface of the shaft bore for receiving sealing ring segments. The housing has a recess in the end face of the housing which is open toward the shaft bore, and has at least the width and height of a ring segment and an axial depth sufficient to intersect said circular slot. A plurality of ring segments are inserted into said circular slot through the recess and a shaped fitting piece is mounted to close off the recess. A plurality of slots and sealing ring segments may be used to provide a sealing labyrinth.

More particularly, the present invention provides in the surface of the shaft bore at least one undercut circular spot for receiving the labyrinth ring segments. The segments are inserted through a recess in the housing which is at least the width and height of a ring segments and has a depth sufficient to intersect the most distant slot so that the ring segments can be inserted into the slots through this recess. Thereafter, the recess is closed by a specially shaped cover piece.

With the present invention it is possible to install the shaft seal in a unitary housing so that a separate suspension and bolting of joints of a split housing are avoided.

The principal object of the present invention is to provide a shaft seal for unitary housings which is built into the housing itself. Another object of the invention is to provide a plurality of seals in a unitary housing.

Another object of the invention is to provide a seal labyrinth in a unitary housing.

Another object of the invention is to provide new and improved shaft seal means for steam turbines having a housing with a shaft bore, comprising a circular slot in the surface of the shaft bore for receiving labyrinth sealing ring segments, said housing having a recess in the end face of the housing, said recess being open toward the shaft bore, said recess having at least the width and height of a ring segment and an axial depth sufficient to intersect said circular slot, a plurality of ring segments inserted into said circular slot through said recess and a fitting piece shaped to close off said recess.

Other features which are considered as characteristic for the invention are set forth in the appended claims.

Although the invention is illustrated and described herein as embodied in a particular embodiment, it is nevertheless not intended to be limited to the details shown, since various modifications may be made therein without departing from the spirit of the invention and the scope and range of equivalents of the claims.

The construction and method of operation of the invention, however, together with additional objects and advantages thereof will be best understood from the following description when read in connection with the accompanying drawings, in which:

FIG. 1 is a longitudinal cross sectional view through a part of the housing in the region of the shaft bore with one labyrinth ring inserted.

FIG. 2 is a cross sectional view through the region of the shaft bore according to the section line II—II in FIG. 1.

FIG. 3 is a longitudinal cross sectional view according to FIG. 1, and along line III—III of FIG. 4, with the labyrinth shaft seal completely built in.

FIG. 4 is a cross sectional view according to the section line IV—IV in FIG. 3.

FIG. 5 is a side view of a fitting piece.

FIG. 6 is a cross sectional view through a fitting piece on the section line VI—VI in FIG. 5.

FIG. 1 is a longitudinal view partly in cross section through a part of the housing 1, at the outflow side of a turbine. The shaft 3 of the turbine is mounted in the shaft bore 2, together with partly indicated seal bands 4. Three circular slots, 5, 6 and 7, are cut into the circumferential surface of the shaft bore 2 for receiving the labyrinth seals which comprise individual ring segments 8. The ring segments 8 are installed into the slots through a recess 10 machined in the end face 9 of the housing. The recess 10 is at least the height and width of a ring segment 8 (see FIG. 2.). The depth of the recess 10 is sufficiently large so that the axially innermost slot 7 is intersected by the recess so that the ring segments 8 can be installed through the recess 10 into the slot 7.

After the first ring segment is inserted, it may be rotated into its final position in the slot 7 by means of a tubular installation fixture 11, FIG. 1, which has at its front end pins 12, adapted to engage holes 13, FIG. 2, of the ring segments 8. The installation fixture 11 may be rotated by suitable levers 14. Additional ring segments are inserted through the recess and adjusted in rotational position by the installation fixture 11 until all ring segments of a complete ring are inserted into the slot 7.

The ring segments 8 fit in the slots so that two of them are onehalf in the slot and one-half in the recess. In order to prevent the ring segments from rotating, a locking pin 22 is provided, which locks the fitting piece 15, to the ring segments pin extending from a hole 23, in the segment 8 to the corresponding hole in the fitting piece 15.

When the first slot 7 is filled with ring segments, the recess 10 is closed by means of a fitting piece 15, FIG. 3, which also extends over to the center of the adjacent slot 6. The fitting piece is shown in detail in FIGS. 5 and 6. It is curved at its inner circumference corresponding to the circular slots 6 and 7 and has a hammer-head 18, extending to the barrier point 21 FIG. 1. Therefore, after the fitting piece 15 is inserted, the slot 7 is closed. One side of the hammer-head of the ring segment 8 rests in the recess 16, FIG. 4.

After the fitting piece 15 is installed, ring segments are then installed in the next slot 6, in the same manner as previously described. This section of the recess 10 is then closed by another suitably shaped piece 24, which carries another antirotation pin 22.

A third row of ring segments 8, is then inserted into the slot 5 and the final fitting piece 25, is installed so that the recess 10, is completely filled. The segments 8 may be tensioned by spring 40.

These fitting pieces may be then clamped to the housing, for instance, by four screws 26, which may be screwed into corresponding tapped holes 27, in the housing at the rear wall of the recess (see FIG. 3). The screws 26, can then be prevented from turning by a securing plate 28, bearing against the screw head. FIG. 4 shows a view into the last fitting piece 25, showing the screws 26.

As shown in FIG. 3, in order to create intermediate pressure chambers in this seal a further one-piece cover 30 may be attached to the end face of the housing by means of screw 31 so that an intermediate pressure chamber 32 is obtained thereby.

The one piece cover 30 also has a number of ring segments 33, which are installed via a corresponding recess 34 into the slot 36 from the end face 35, of the cover member. Recess 34 is then also closed off by a suitable fitting piece 37 with an anti-rotating device 22 and clamped on the base of the cover by screw 38. Additional conventional covers may be added if desired.

Therefore, the present invention eliminates the necessity for a separate housing for the shaft seals. This results in increased safety and is preferable mechanically as the flexure end internal pressure is reduced substantially. Therefore, smaller axial clearance becomes possible.

I claim:

1. Shaft seal means for steam turbines comprising:
    an axially unitary housing having an end face and formed with a shaft bore-hole, a recess extending from said shaft borehole, a recess extending from said end fall in an axial direction and open towards said shaft bore-hole, and a plurality of mutually adjacent circular slots communicating with said recess and said bore-hole;
    a plurality of labyrinth seals receivable in said slots, respectively each of said seals comprising a plurality of ring segments, mutually in contact with each other in circumferential direction; and
    a plurality of fitting piece means for closing said recess upon selective filling of said slots with said fitting-piece means, each of said fitting-piece means having a hammer-head and being shaped to conform substantially to the contour of said recess and said slots.

2. Shaft seal means according to claim 1, wherein each of said ring segments and fitting-piece means is formed with respective holes and openings, and including a plurality of anti-rotation devices received in said holes and openings.

3. Shaft seal means according to claim 1, further comprising a plurality of axially extending threaded fasteners, and wherein said fitting-piece means are respectively secured by said threaded fasteners to said housing.

* * * * *